US006730255B2

(12) United States Patent
Takeuchi et al.

(10) Patent No.: US 6,730,255 B2
(45) Date of Patent: May 4, 2004

(54) METHOD OF MANUFACTURE OF RESIN BLOCK

(75) Inventors: Ryozo Takeuchi, Hitachi (JP); Junpei Kusukawa, Hitachi (JP); Koji Obata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/462,741

(22) Filed: Jun. 17, 2003

(65) Prior Publication Data

US 2003/0218273 A1 Nov. 27, 2003

Related U.S. Application Data

(63) Continuation of application No. 09/793,509, filed on Feb. 27, 2001, now Pat. No. 6,649,847.

(30) Foreign Application Priority Data

Sep. 1, 2000 (JP) ....................................... 2000-265842

(51) Int. Cl.$^{7}$ .......................... B29C 45/14; B29C 70/84

(52) U.S. Cl. .................... 264/277; 264/261; 264/271.1; 264/272.11

(58) Field of Search ......................... 174/149 R, 137 R, 174/148, 138 R, 138 C; 264/259, 261, 263, 275, 271.1, 272.11, 272.15, 277

(56) References Cited

U.S. PATENT DOCUMENTS

| | | | | |
|---|---|---|---|---|
| 3,801,609 A | | 4/1974 | Farish | |
| 3,962,609 A | | 6/1976 | Chaudhuri | |
| 4,187,653 A | | 2/1980 | Kliewer, Jr. | |
| 4,346,541 A | | 8/1982 | Schmitt | |
| 4,369,391 A | * | 1/1983 | Micheron | 310/332 |
| 4,530,949 A | | 7/1985 | Atkinson et al. | |
| 4,608,453 A | | 8/1986 | Freeman | |
| 4,659,424 A | * | 4/1987 | Baxter et al. | 156/51 |
| 4,918,801 A | * | 4/1990 | Schwarz et al. | 29/596 |
| 4,940,504 A | * | 7/1990 | Starnes, Jr. | 156/500 |
| 5,125,179 A | | 6/1992 | Campbell et al. | |
| 5,156,715 A | * | 10/1992 | Starnes, Jr. | 156/500 |
| 5,175,396 A | * | 12/1992 | Emery et al. | 174/36 |
| 5,201,903 A | * | 4/1993 | Corbett et al. | 29/872 |
| 5,449,480 A | * | 9/1995 | Kuriya et al. | 264/112 |
| 5,520,976 A | | 5/1996 | Gianetti et al. | |
| 5,591,364 A | | 1/1997 | Suppelsa et al. | |
| 5,650,031 A | * | 7/1997 | Bolon et al. | 156/244.12 |
| 5,728,474 A | | 3/1998 | Niemeyer et al. | |
| 6,317,335 B1 | | 11/2001 | Zayatz | |
| 6,505,955 B1 | * | 1/2003 | Hatjasalo et al. | 362/235 |
| 6,645,416 B2 | * | 11/2003 | Oesterheld et al. | 264/275 |

* cited by examiner

*Primary Examiner*—Angela Ortiz
(74) *Attorney, Agent, or Firm*—Antonelli, Terry, Stout & Kraus, LLP

(57) ABSTRACT

A method for manufacture of a resin block includes setting high-voltage and low-voltage side conductors in dies, assembling the dies, extruding resin so as to form a resin block having the high-voltage side conductor and the low-voltage side conductor embedded therein, cooling the molded resin block, and taking out the molded resin block from the dies.

10 Claims, 6 Drawing Sheets

METHOD OF MANUFACTURE OF RESIN BLOCK

CROSS REFERENCE TO RELATED APPLICATION

This is a continuation of U.S. application Ser. No. 09/793, 509, filed Feb. 27, 2001 now U.S. Pat. No. 6,649,847, the subject matter of which is incorporated by reference herein.

BACKGROUND OF THE INVENTION i) Field of the Invention

The invention relates to an insulating system for an electric appliance having a high-voltage part, and more particular, to an insulating system which is excellent in recycling of materials.

ii) Description of the Related Art

Heretofore, resin-molding systems have been used for a construction, in which a part being subjected to high voltage is enclosed by an insulating material to enhance reliability in electric insulation. In such measure, in order to form a resin layer around a part being subjected to high voltage, the high-voltage part is assembled in dies, into which a resin is injected and cured. Accordingly, the resin comes into close contact with the high-voltage part, and so disassembly thereof cannot be readily made. Also, it is difficult to recycle metallic materials, such as copper and aluminum, used in the high-voltage part in the resin. However, reliability in electric insulation is remarkably high in such system, which has this system used in many appliances.

SUMMARY OF THE INVENTION

An object of the invention is to provide an insulating system, which enables easy disassembly, and separation and reuse of materials, which constitute an electric appliance.

The invention has a feature in a resin block insulating system comprising a plurality of resin blocks laid so as to cover a high-voltage part.

More specifically, the above object is attained by blocking an insulating layer, which covers a periphery of an electric appliance to insulate high voltage, such that the thus formed insulating blocks closely cover a high-voltage part of the electric appliance. That is, the insulating blocks are spread over as tiles are laid. The insulting blocks are made of a resin to take charge of insulation. However, with such measure, fine gaps are present in boundaries between the insulating blocks to cause poor insulation there. Hereupon, slanting or inclined surfaces are formed to increase insulation length for enhanced reliability, thus ensuring an insulation quality equivalent to that obtained with the insulating blocks. In this manner, it is possible to provide an insulating system, which possesses adequate insulation quality and is easy to disassemble.

DETAILED DESCRIPTION OF THE PREFERRED EMBODIMENTS

Figure 1:
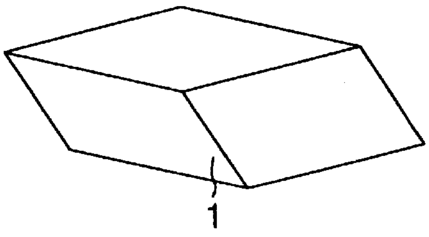
FIG. 1 is a view showing a resin block according to an embodiment of the invention.

FIG. 1 shows a resin block 1 according to an embodiment of the invention. The block is in the form of a parallelepiped, of which slanting or inclined surfaces are capable of ensuring adequate insulation lengths. One (back surface) of two parallel surfaces makes a high-voltage side, and the other (front surface) of the surfaces makes a low-voltage side. The resin block 1 is made of a thermosetting resin or a thermoplastic resin. The resin block 1 should be manufactured to contain no voids or cracks.

Figure 2:
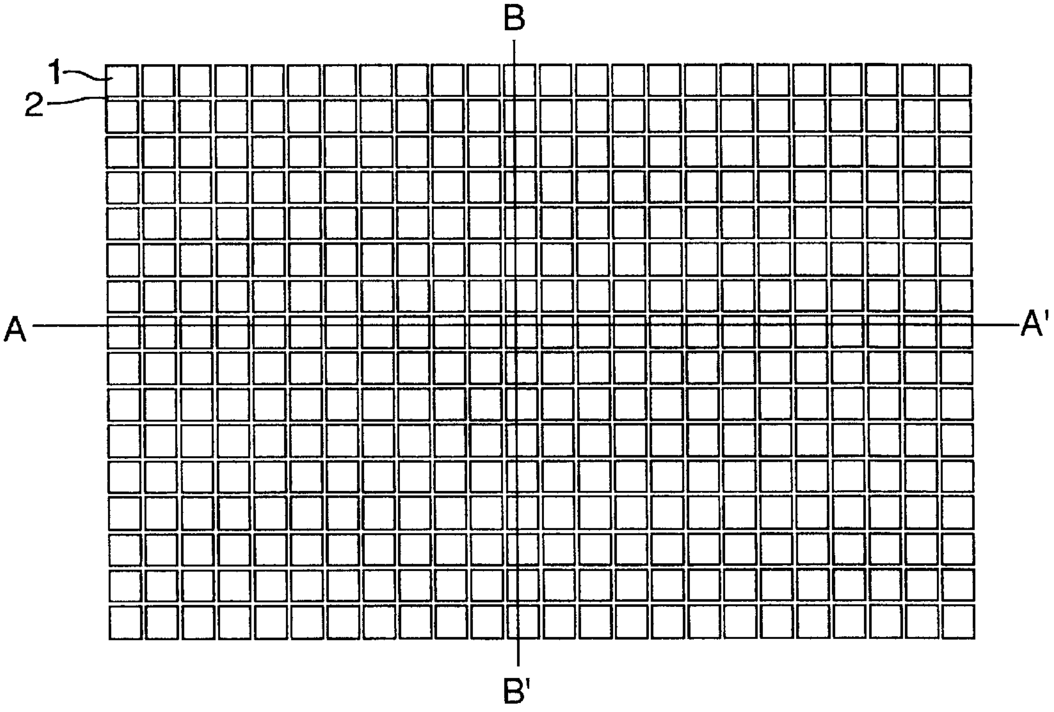
FIG. 2 is a view showing a top surface, over which resin blocks according to the invention are spread.
Figure 3:
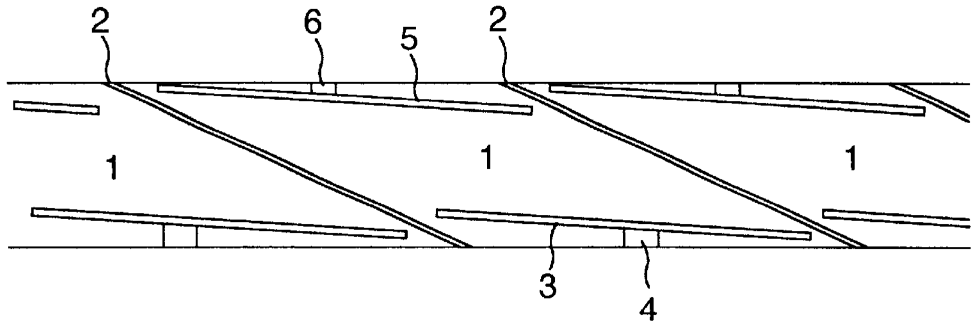
FIG. 3 is a cross sectional view showing the surface, over which resin blocks are spread, according to the invention.
Figure 4:
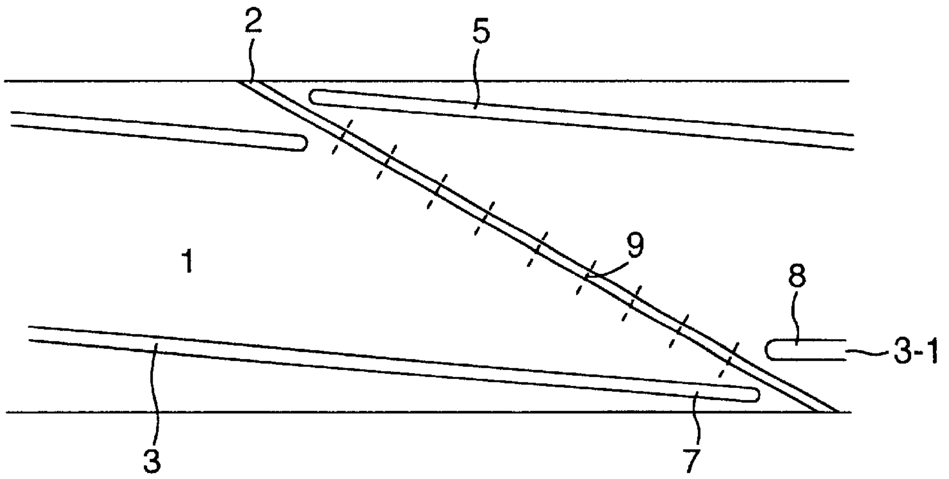
FIG. 4 is a view showing the potential distribution in gaps according to the invention.

FIG. 2 shows a situation, in which the resin blocks are densely spread in a planar fashion. The resin blocks are densely spread with gaps 2 therebetween. In this manner, the planar surface is constituted as such. FIG. 3 is cross sectional views taken along the line A–A' and the line B–B'. The resin blocks 1 are densely arranged with gaps 2 therebetween, which is a basic configuration. Further, in order to enhance the insulation performance of the slanting or inclined surfaces on the gaps 2, high-voltage side conductors 3 are embedded on the back surface side of the resin blocks 1, and low-voltage side conductors 5 are embedded on the front surface side of the resin blocks 1. Further, high-voltage side connections 4 and low-voltage side connections 6 are embedded in the resin blocks 1 to electrically connect the high-voltage and low-voltage side conductors to the outside. With such arrangement, as shown in FIG. 4, a line connecting between a gap-side end 7 of a high-voltage side conductor 3 and a gap-side end 8 of an adjacent high-voltage side conductor 3-1 is substantially perpendicular to an associated gap 2, whereby, as apparent from an equipotential line distribution 9, a potential distribution in the gap are made uniform for effective use of an insulation length of the gap, thereby enabling further enhancing the insulation performance. The high-voltage side connections 4 and the low-voltage side connections 6 can be made in the form of a nut. In this case, leads from a high-voltage part and a low-voltage part of an electric appliance are connected to bolts. Further, the high-voltage side connections 4 and the low-voltage side connections 6 can be made in the form of lead wires. In this case, respective lead wires are connected to the high-voltage part and the low-voltage part.

Figure 5:
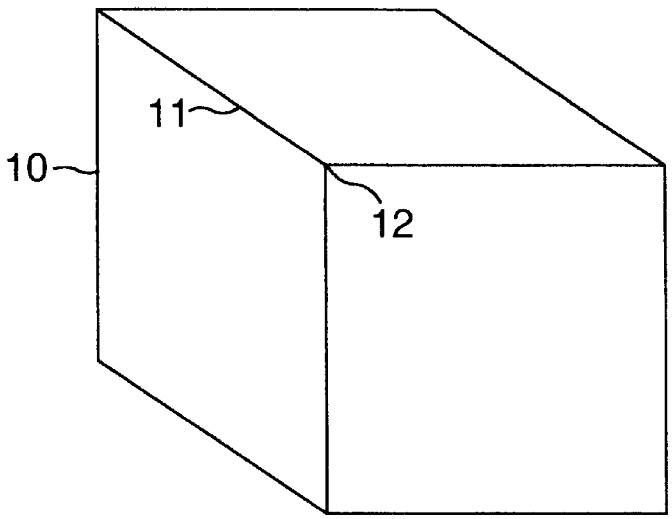
FIG. 5 is a view showing a high-voltage part according to the invention.
Figure 6:
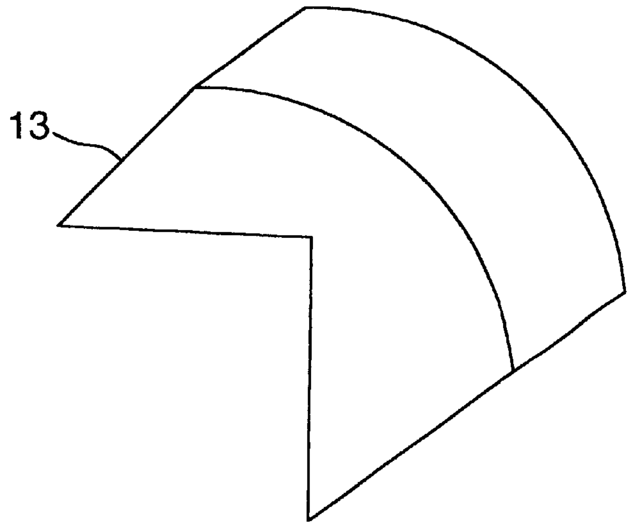
FIG. 6 is a view showing a resin block for the ridgeline portion, according to the invention.
Figure 7:
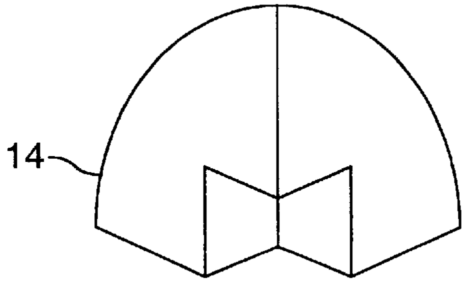
FIG. 7 is a view showing a resin block for the apex, according to the invention.

FIG. 5 shows a high-voltage body 10 in the form of a general parallelepiped, over respective faces of which body the resin blocks 1 may be densely spread. However, the resin blocks 1 shown FIG. 1 cannot be applied on respective ridgeline portions 11 and respective apexes 12 of the body. Resin blocks 13 for the ridgeline portion shown in FIG. 6 are applied on the ridgeline portions 11. Also, resin blocks 14 for the apex shown in FIG. 7 are applied on the apexes.

Figure 8:
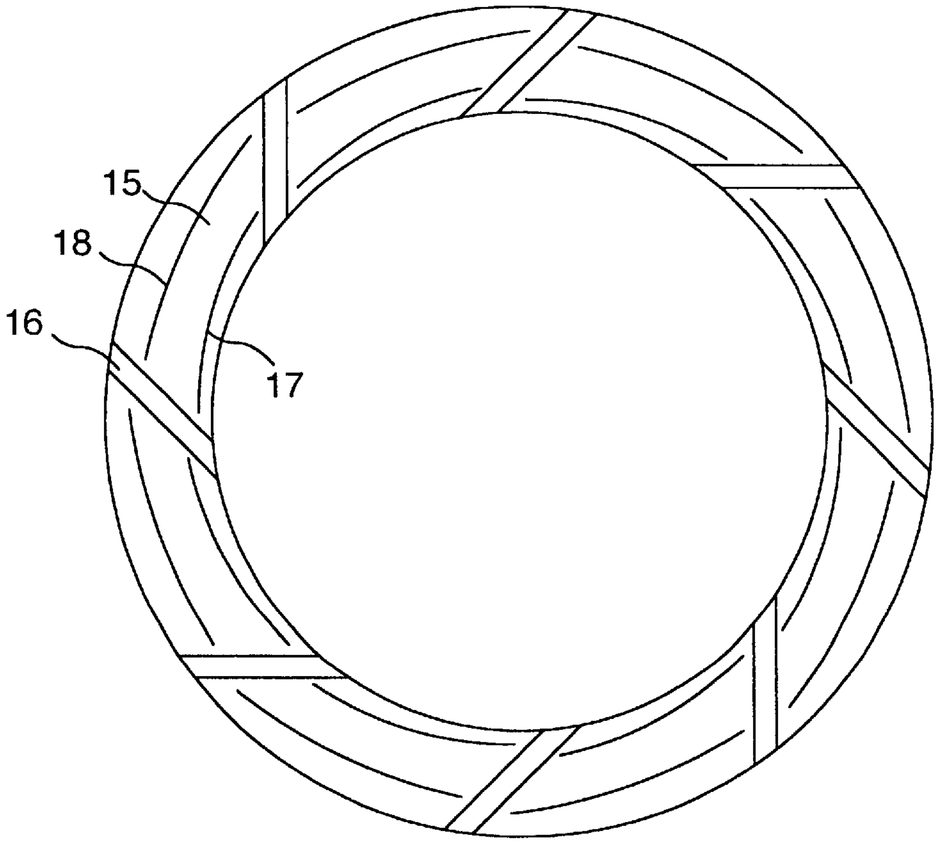
FIG. 8 is a cross sectional view showing resin blocks for a cylinder, according to the invention.

FIG. 8 shows resin blocks used for a cylindrical-shaped electric appliance, over which the resin blocks 15 for a cylinder are circumferentially spread. Gaps 16, high-voltage side conductors 17 and low-voltage side conductors 18 in the cylinder resin blocks for a cylinder are constructed in a similar manner to those for a planar surface. Although not shown in this figure, high-voltage side connections and low-voltage side connections are constructed in a similar to those for a planar surface.

Figure 9:
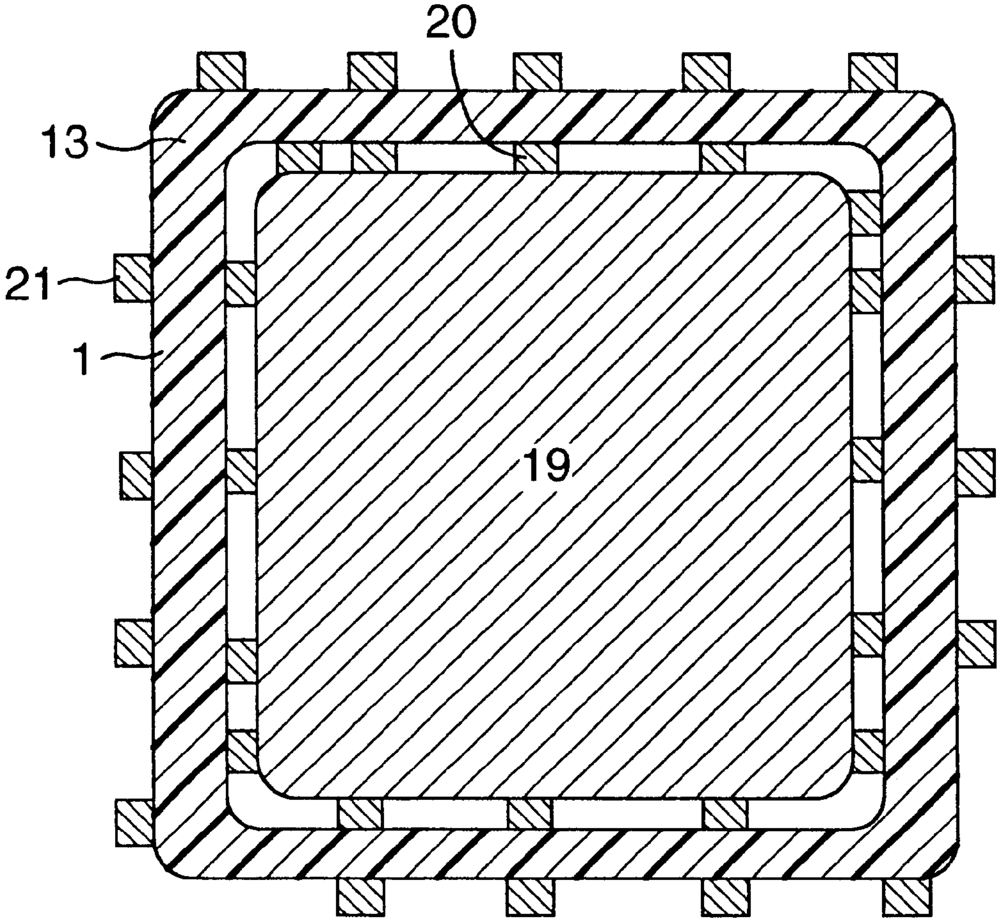
FIG. 9 is a cross sectional view showing a high-voltage appliance, on which resin blocks are arranged, according to the invention.

FIG. 9 is a cross sectional view showing a high-voltage appliance using the resin blocks. High-voltage side block mounting jigs 20 are mounted on a periphery of a high-voltage portion 19 of the appliance, and the resin blocks 1 are spread over the high-voltage side block mounting jigs 20 with little gaps therebetween. Further, resin block crimp jigs 21 are mounted on outer peripheries of the resin blocks 1 to fix the resin blocks 1.

Thus, the high-voltage portion is covered with the resin blocks 1 whereby an electrical insulation performance equivalent to that of electrical insulating layers formed by a conventional resin mold technique is given to remarkably improve a quality of disassembly. It is possible to break up and separate the high-voltage appliance into parts, and to reuse required parts. Also, even in the event of getting out of order, repair can be made by replacing only a part or parts having a trouble. That is, an insulating system can be provided which is excellent in quality of repair and recycling.

While thermosetting resins such as epoxy resin or polyester resin having been used in conventional resin mold techniques may be used as a resin for the resin blocks, a resin material can be melted upon temperature rise in the use of thermoplastic resin such as polyethylene, thus making it possible to reuse the high-voltage side conductors 3 and the low-voltage side conductors 5.

In order to prevent entry of moisture and to increase dielectric strength, it is preferable to fill a viscous material into the gaps. Silicone resin, silicone oil, grease or the like are suitable as the viscous material.

Figure 10:
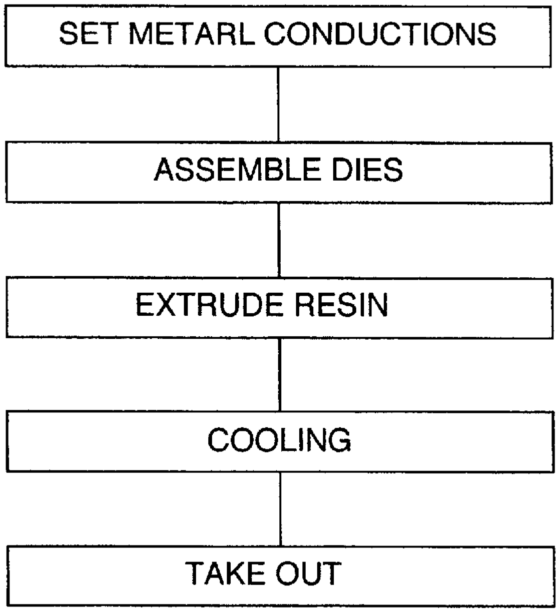
FIG. 10 is a flowchart for manufacture of a resin block, according to the invention.

FIG. 10 is a flowchart for manufacture of a resin block, in which high-voltage and low-voltage side conductors are set in dies, then the dies are assembled, a resin is extruded and is cooled, and the thus molded resin block is taken out from the dies. That is, an ordinary extrusion method, casting method and the like can be used for manufacture of the resin blocks.

Figure 11:
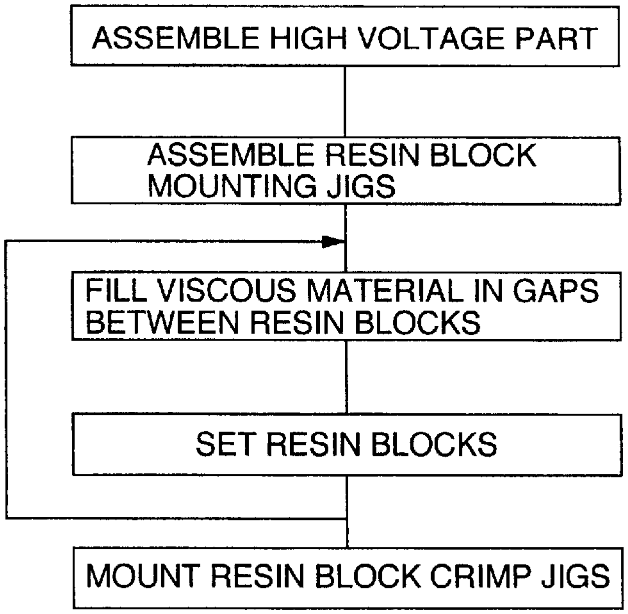
FIG. 11 is a flowchart for the attachment of the resin blocks to a high-voltage part, according to the invention.

FIG. 11 shows a flowchart for the attachment of the resin blocks to a high-voltage part.

Firstly, the high-voltage part is assembled, resin block mounting jigs are assembled around the high-voltage part, a viscous material is filled into gaps between resin blocks, which are then attached to the mounting jigs. After the resin blocks are attached to the front surface of the high-voltage part, resin block crimp jigs are mounted. In this way, the resin blocks can be simply assembled.

According to the invention, it is possible to provide an insulating system, which is excellent in recycling quality in terms of its ability for easy disassembly and reuse of necessary parts.

What is claimed is:

1. A method for manufacture of a resin block, comprising the steps of:

setting high-voltage and low-voltage side conductors in dies;

assembling the dies;

extruding resin so as to form a resin block having the high-voltage side conductor and the low-voltage side conductor embedded therein;

wherein the low-voltage side conductor is embedded on a front surface side of the resin block and the high-voltage side conductor is embedded on a back surface side of the resin block cooling the molded resin block; and taking out the molded resin block from the dies.

2. A method for manufacture according to claim 1, wherein a plurality of resin blocks are manufactured.

3. A method for manufacture according to claim 1, wherein the resin is a thermoplastic resin.

4. A method for manufacture according to claim 2, wherein the plurality of resin blocks are arranged so as to form a resin block insulating system.

5. A method for manufacture according to claim 2, wherein the plurality of resin blocks are arranged to cover a high-voltage part so as to form a resin block insulating system, and each of the resin blocks has a side surface opposite to a side surface of an adjacent resin block with a gap formed therebetween.

6. A method for manufacture according to claim 4, wherein the side surfaces of the adjacent resin blocks are substantially parallel with each other and extend in an inclined direction with reference to a thickness direction of the resin block insulating system so as to extend an insulation length of the gap.

7. A method for manufacture according to claim 5, wherein the resin is a thermoplastic resin.

8. A method for manufacture according to claim 5, wherein a viscous material is filled into the gap formed between adjacent resin blocks.

9. A method for manufacture according to 3, further comprising the steps of:

assembling a high-voltage part;

assembling resin block mounting jigs around the high-voltage part;

filling gaps between a plurality of resin blocks which are then attached to the mounting jigs; and mounting resin block crimp jigs.

10. A method for manufacture according to claim 9, wherein the gaps are filled with a viscous material.

* * * * *